United States Patent [19]

Valyi

[11] 4,092,391
[45] May 30, 1978

[54] METHOD OF MAKING MULTILAYERED CONTAINERS

[76] Inventor: Emery I. Valyi, 5200 Sycamore Ave., Riverdale, N.Y. 10471

[21] Appl. No.: 743,644

[22] Filed: Nov. 22, 1976

Related U.S. Application Data

[63] Continuation-in-part of Ser. No. 710,171, Jul. 30, 1976, Pat. No. 4,048,361, which is a continuation of Ser. No. 518,264, Oct. 29, 1974, abandoned.

[51] Int. Cl.² .................... B65D 23/00; B65D 23/02
[52] U.S. Cl. .................................... 264/97; 215/1 C; 426/127; 426/133; 426/415; 428/212; 428/483; 428/35; 428/507; 428/509; 428/510; 428/513; 428/514; 428/518; 428/520; 428/522
[58] Field of Search ............... 428/35, 483, 507, 509, 428/510, 513, 514, 518, 520, 522, 212; 264/97; 426/127, 133, 415; 215/1 C

[56] References Cited

U.S. PATENT DOCUMENTS

| | | | |
|---|---|---|---|
| 3,364,521 | 1/1968 | Valyi | 264/97 |
| 3,415,916 | 12/1968 | Valyi | 264/97 |
| 3,429,717 | 2/1969 | Cook | 428/910 |
| 3,717,544 | 2/1973 | Valyi | 428/35 |
| 3,719,735 | 3/1973 | Valyi | 428/35 |
| 3,733,309 | 5/1973 | Wyeth | 426/127 |
| 3,776,991 | 12/1973 | Marcus | 264/97 |
| 3,797,983 | 3/1974 | Merz | 264/97 |
| 3,944,645 | 3/1976 | Farrell | 264/97 |
| 3,955,697 | 5/1976 | Valyi | 428/35 |
| 3,979,491 | 9/1976 | Zavasnik | 264/97 |

*Primary Examiner*—Ellis P. Robinson
*Attorney, Agent, or Firm*—Robert H. Bachman

[57] ABSTRACT

A method of making multilayered hollow plastic containers having improved resistance to permeation by unwanted gases, especially injection blow molded containers having a preformed inner lining which is applied to a core prior to the formation of the composite parison. One layer is a barrier plastic having substantial but incomplete resistance to gas permeation, and another layer contains a getter material capable of binding unwanted gas uniformly dispersed throughout. The resultant improved container is characterized by having improved resistance to gas permeation.

12 Claims, 9 Drawing Figures

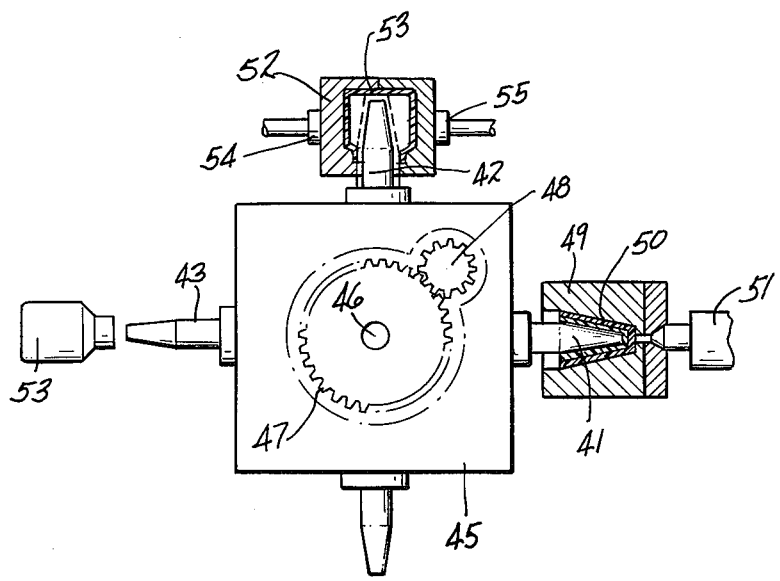
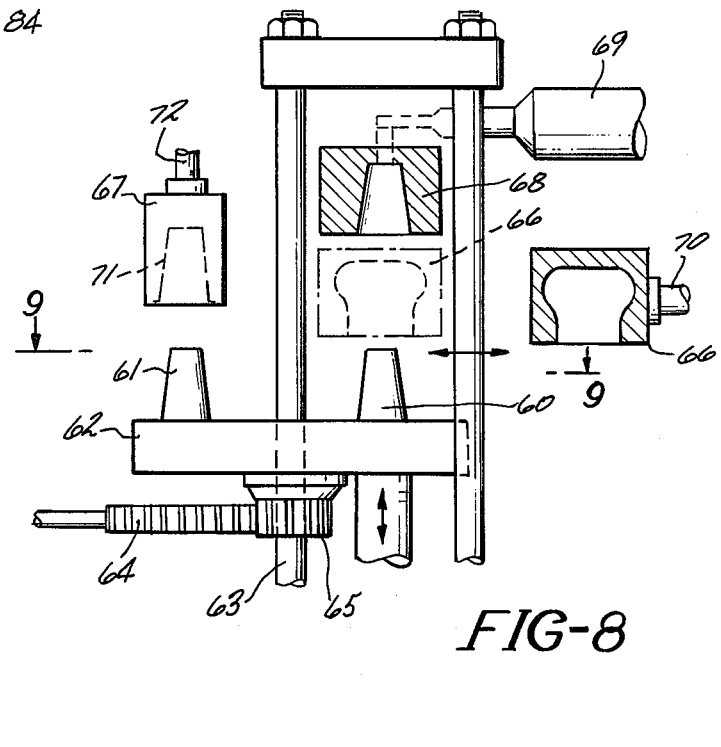

METHOD OF MAKING MULTILAYERED CONTAINERS

CROSS REFERENCE TO RELATED APPLICATIONS

This application is a continuation-in-part of copending United States Patent Application No. Ser. No. 710,171, filed July 30, 1976 by Emery I. Valyi now U.S. Pat. No. 4,048,361, which in turn is a continuation of United States Patent Application Ser. No. 518,264, filed Oct. 29, 1974 by Emery I. Valyi now abandoned.

BACKGROUND OF THE INVENTION

The use of partially permeable materials, e.g., one of the so-called gas barrier plastics, presents a novel problem in the packaging of perishable commodities, such as edible oils and fats, other foods, carbonated beverages, wine and beer, and also of other materials that are affected by continuing exposure to the atmosphere. The problem derives from the fact that, in contrast to the materials customarily used for packaging under such conditions, namely glass and metal, these materials are partially permeable and thus do not provide absolute protection because they are never completely impervious.

The art has developed materials that are relatively impervious to given substances. These "better" materials tend to be more expensive, and despite the added cost even they have a finite permeability.

For example, in the field of plastics the approach taken heretofore was to develop barrier polymers with better permeation impedance for specific substances, such as oxygen carbon dioxide, water vapor, aromatics, etc. These efforts did meet with considerable success. Thus, for example, the permeation rate of oxygen was reduced by a factor of several orders of magnitude from polystyrene to the newly developed acrylonitrile copolymers, or to a lesser degree to terephtalic polyesters and polyvinyl chloride. Nevertheless, a definite amount of permeation remains even in the best plastic due to the molecular arrangement thereof.

Composite blow molded containers have been prepared as described in my prior U.S. Pat. Nos. 3,719,735 and 3,717,544. According to said patents, previously formed sleeve-like liners are applied to a blow core of an injection blow molding apparatus, plastic is injected around said liners while upon the cores, and the resultant composite parison consisting of the liner and the injected plastic is expanded together into conformance with a blow mold. While these composite containers represent a considerable improvement due particularly to their ability to combine properties of different plastics, one of which may be a barrier plastic, a definite amount of permeation still remains even in these improved materials.

As a result, a new factor must be introduced whenever it is desired to package perishables in plastic or other partially permeable materials, namely shelf-life. While a metal can or glass jar will keep its contents unchanged for a practically indefinite period, a time limit, mostly in terms of weeks, must be prescribed for the plastics, modified paper, etc.

Accordingly, it is a principal object of the present invention to provide a method for the preparation of multilayered, hollow plastic containers having improved resistance to gas permeation, especially air permeation, and also to provide an improved container.

It is a further object of the present invention to provide a method as aforesaid which is inexpensive and convenient and which utilizes a partially permeable barrier material in an arrangement which significantly increases the resistance of the container to gas permeation.

Further objects and advantages of the present invention will appear hereinafter.

SUMMARY OF THE INVENTION

In accordance with the present invention, it has been found that the foregoing objects and advantages can be readily obtained. The present invention relates to a method of making multilayered hollow plastic containers formed on a core in a mold by molding the plastic around the core in a mold cavity, and preferably including the step of subsequently expanding in a blow mold. In accordance with the improvement of the present invention, a sleeve is formed at least a portion of which is a carrier containing a getter material uniformly dispersed therein capable of binding unwanted gas, the sleeve is applied to the core, a barrier plastic layer is formed around said sleeve, said barrier plastic having substantial but incomplete resistance to gas permeation, the sleeve and barrier layer are then preferably expanded together in a blow mold to form a multilayered hollow plastic container having improved resistance to gas permeation, with the layers being adhered to each other substantially over the entire contacting area. In a preferred embodiment the sleeve is a laminated composite comprising an inner layer which is the carrier containing said getter and an outer layer which is the barrier. The composite sleeve is then applied to the core and a third plastic layer is pressure molded therearound. The resultant material is then expanded together in a blow mold to form the container.

The resultant container is a seamless, multilayered, hollow plastic container having an inner layer of a plastic carrier containing a getter material capable of binding unwanted gas and an outer layer of a barrier plastic having substantial but incomplete resistance to gas permeation, wherein said container has a bottom and side walls integral therewith and extending therefrom terminating in an open mouth suitable for being closed by a cover having improved resistance to unwanted gas permeation. In a preferred embodiment the container contains three (3) layers, with the innermost being the getter-containing carrier layer, the middle layer being the barrier material and the outer layer being a pressure molded plastic. The outer pressure molded layer is preferably an inexpensive plastic, such as polystyrene or a polyolefin having sufficient mechanical strength to protect the content of the container.

The getter is a material which is capable of chemically binding, absorbing, or adsorbing the unwanted permeating gas. Thus, for example, an anti-oxidant may be used to absorb and bind oxygen. The carrier containing dispersed getter material is laminated with a barrier plastic in accordance with the method of the present invention, wherein the barrier is chosen to provide substantial but incomplete resistance to permeation of the unwanted gas. Naturally, the carrier must contain sufficient getter to bind substantially all gas which permeates the barrier. Hence, if migration of oxygen is to be prevented the barrier would be a plastic which is resistant to the migration of oxygen, as an acrylonitrile containing polymer, and the carrier would contain sufficient antioxidant to bind substantially all oxygen permeating the barrier.

The resultant composite has greatly improved resistance to gas permeation. Naturally, after filling the container a cover should be employed which is also resistant to gas permeation, as a cover of the composite of the present invention or a metal cover. Hence, a container may be fabricated in accordance with the present invention which is characterized by being virtually impervious to gas permeation.

In operation the resultant composite is capable of using a good barrier which nevertheless has a finite permeability, permitting comparatively small amounts of the unwanted gas to migrate therethrough in such a manner that said unwanted gas, to the extent that it so migrates and at the rate of its migration, is "captured" by a getter capable of stopping further migration, i.e., diffusion or other flow of the gas. Obviously, if the barrier were to permit substantial permeation, i.e., if it were a poor barrier, the amount of getter that may be practically juxtaposed thereto would be exhausted too soon for practical purposes.

If necessary, a plurality of layers may be employed; for example, the carrier containing dispersed getter may be sandwiched between two barrier layers by providing a sleeve that is a laminate with the carrier between two barrier layers. Alternatively, one may provide a laminated sleeve with an inner carrier and two outer barrier layers. Thus, one may design a composite having resistance to a variety of gases based on the characteristics of the barrier layers and/or the getter. As a still further alternative two or more different getter materials may be used to provide protection against two or more gases together with two or more outer barrier layers, if desired.

BRIEF DESCRIPTION OF DRAWINGS

The present invention will be more readily understandable from consideration of the accompanying drawings in which:

FIG. 5 is a sectional view of another embodiment of a composite sleeve wherein the getter is embedded in the carrier;

FIG. 6 is a sectional view of a three-layered composite sleeve of the present invention;

FIG. 7 is an elevation, partly in section, showing the process of the present invention with a plurality of blow cores moveable in a rotary direction;

FIG. 8 is an elevation, partly in section, showing laterally moveable blow cores; and FIG. 9 is a section taken on the line IX—IX of FIG. 8.

DETAILED DESCRIPTION

In the preferred embodiment the process of the present invention forms a composite container having an outer layer of plastic material, a second layer within said outer layer, adjacent thereto and adhered thereto of a barrier plastic having resistance to gas permeation, and an inner carrier layer relative to the barrier layer adjacent the barrier layer. The process of the present invention results in the layers being sufficiently adhered one to the other so that delamination will not readily occur.

The barrier layer is a plastic material which is capable of hindering substantially the permeation of an unwanted gas therethrough. Typical barrier plastics include acrylonitrile copolymers, terephthalic polyesters, polyethylene terephthalates, polyvinylidene dichloride, and the like. Naturally, the particular barrier or combination of barriers employed depends upon the particular results desired.

The outermost layer is preferably an inexpensive plastic, such as polyolefins, polystyrene, polyvinylchloride or the like, which is injection molded around the laminated sleeve to provide additional strength and rigidity to the container at a low cost.

Figure 1:
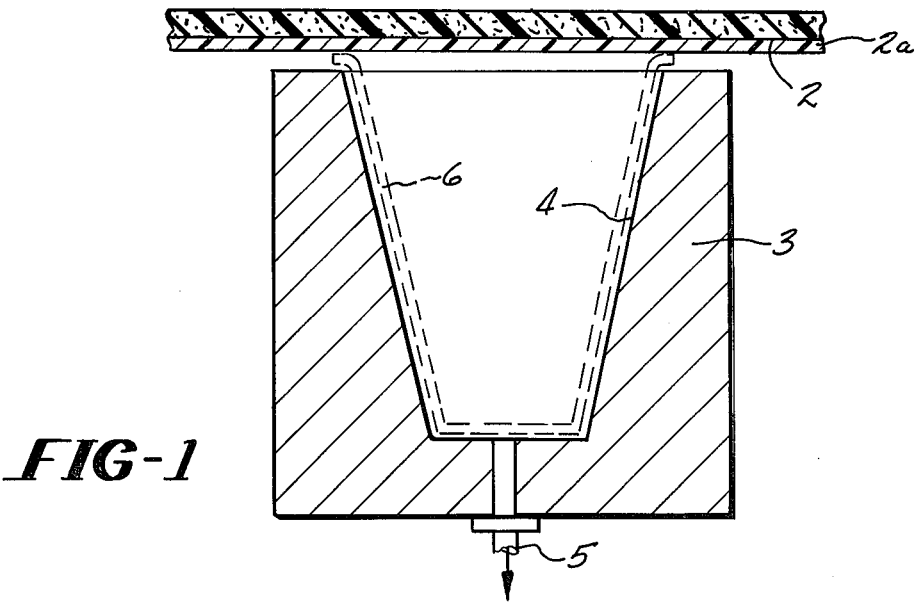
FIG. 1 is a diagrammatic view of a forming mold for forming the plastic sleeve, with the formed sleeve shown in phantom.

In accordance with the present invention as shown in FIG. 1, a getter material 1 is incorporated into and uniformly dispersed throughout the carrier 2, with a barrier layer 2a laminated thereto. This enables a volume of getter to be distributed throughout the carrier to provide a large surface for contact with the unwanted gas. Thus, as shown in FIG. 1, the carrier should be capable of holding the getter uniformly distributed throughout the carrier. Naturally, the getter may be placed on the surface of the carrier, as for example shown in FIG. 5 wherein the getter is embedded in the carrier, so that in the final product the getter is laminated between the barrier layer and the carrier.

The getter will usually be an antioxidant if its function is to be the prevention of oxidation (and rancidity), for example, butylated, hydroxyanisole, di-tertiary-butyl-paracresol, propyl gallate, phenylenethiourea, and aldolalpha-naphthylamine. Naturally, others will readily appear to one skilled in the art. A substantial number of proprietary antioxidants are known to exist, as for example, listed on pages 699 – 703 of the Modern Plastics Encyclopedia, Vol. 50, No. 10A, Oct. 1973.

The getter may be designed to react with other gases than oxygen; for example, activated charcoal may be used, or bactericides may be employed to minimize bacteria or virus transmission. The getter material may be chosen to selectively bind virtually any unwanted material. The dispersion of the getter material in an inexpensive carrier suited to receive the dispersion is a particularly convenient and effective procedure for a variety of reasons. It avoids having to admix the getter with the barrier and possibly vary the desirable properties thereof. It enables one to select an inexpensive carrier which is especially suitable for the particular getter employed, and disperse the getter throughout the carrier so that a large volume of getter surface is available for contact with the unwanted molecule. It avoids having to tamper with the thickness of a possibly expensive barrier layer and utilize only so much of the barrier layer as is necessary to achieve the desired goal.

The physical requirements of the getter system relate to the processing characteristics of its components. Thus, if it is desired to produce a sleeve from a film, it will usually be necessary to choose the getter with the fact in mind that it must be stable at the temperature at which the carrier may have to be worked for the blending-in of the getter; and also at the temperature at which the system has to be processed to convert it into a unitary structure, e.g., a film by extrusion. The system may of course assume other forms than film; it may, for example, be a pressure molded piece. In any case the known art of preparing the system will dictate the specific selection of its components, beyond the basic selection of the chemical function. One particular category of getter may be that of surface active agents, as for example carbon, whereby the carrier would be applied to hold such getter without impeding its surface. The carrier may of course be used to provide characteristics to the structure of which it is a part that are per se unrelated to the specific purposes of this invention: it may be colored, for decorative effect; or, it may be a barrier in its own right, as, for example, a polyolefin carrier would naturally be water vapor barriers.

In accordance with the embodiment shown in FIG. 1, a getter material 1 is uniformly dispersed throughout a sheetlike carrier 2, as for example, polyethylene, and a barrier layer 2a laminated thereto. The getter-containing carrier-barrier composite is placed into juxtaposition with a mold 3 having a mold cavity 4 conforming to the desired shape of the sleeve. Vacuum is applied in the mold cavity through connection 5 and carrier 2 is converted to the shape of the mold cavity 4 to form the cup-like sleeve 6 (shown in phantom in FIG. 1) by vacuum forming, i.e., by a drawing process that intrinsically produces attenuation of the carrier 2. Cutting means (not shown) may cut the formed liner from the web. Naturally, the sleeve may be formed by a wide variety of other methods well known in the art. For example, instead of drawing into a mold, the material may be drawn by vacuum over a shaped plug, or produced by cooperation of a mold and plug as is known in the thermoforming art, or it may be wrapped into a container shape, as is customary in the manufacture of paper containers.

Cover 10 (FIG. 4) should also naturally provide resistance to permeation as being formed from the composite of the present invention. The cover may be applied to the container by any suitable or convenient method, as by heat sealing or providing the container and cover with mating threaded portions, for example, threaded portions 11 and 12, respectively. If the container protects against oxygen permeation, for example, entrance of oxygen through the sealed cover may be prevented by a variety of methods, as by heat sealing the cover to the container, or by providing a depending barrier flange such as flange 13 so that the carrier layer is not exposed to the permeating environment.

Figure 2:
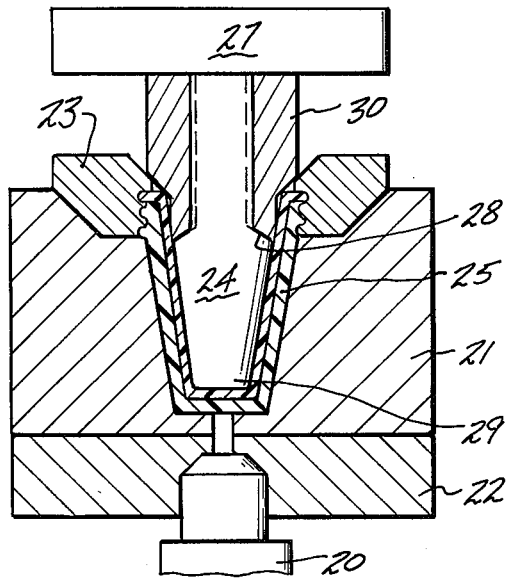
FIGS. 2, 3 and 4 are elevations, partly in section, showing the steps of the process of the present invention, with FIG. 4 including the cover.
Figure 3:
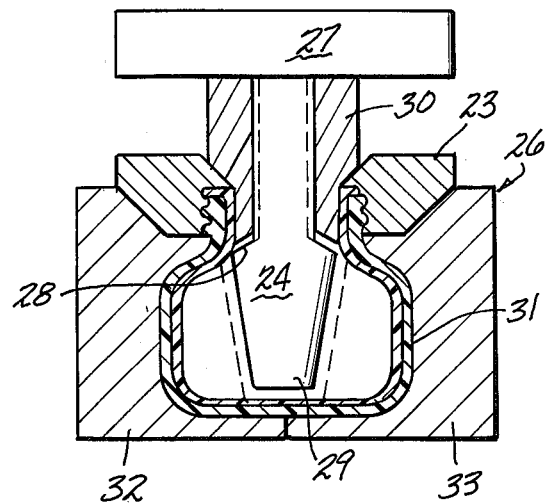
Figure 4:
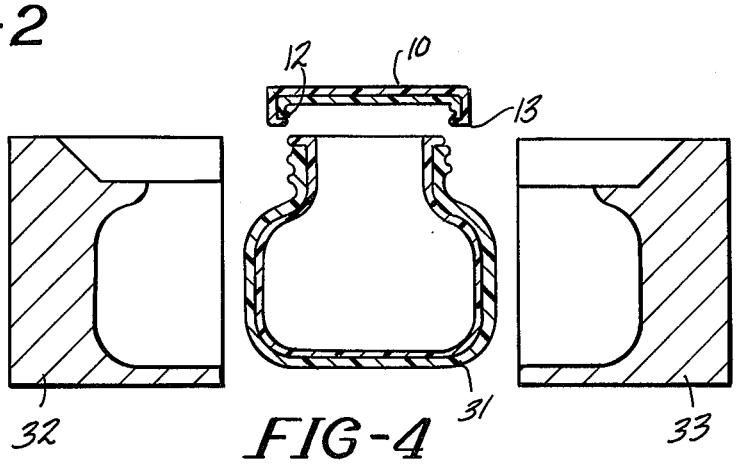

FIGS. 2, 3 and 4 show the formation of the lined hollow plastic containers of the present invention wherein the previously formed sleeve is applied to a blow core of an injection blow molding apparatus, plastic is injected around said liner while upon the core, and the resultant composite parison consisting of the composite liner and the injected plastic, expanded together into conformity with a blow mold.

Referring to the drawings in more detail, FIG. 2 shows an extruder or other known injection unit 20 which provides hot molten plastic under pressure to a parison mold assembly. The parison mold assembly consists of the parison mold 21 which communicates with the injection unit 20 by means of runner plate 22, a neck or rim mold 23 and the core 24 (which is usually a blow core) whereby the parison mold 21, the neck mold 23 and the core 24, when assembled as shown, form the parison mold cavity 25 between them. FIG. 3 shows a blow mold assembly comprising a blow mold 26 and the neck mold 23 and core 24 previously referred to in conjunction with the parison mold assembly.

In operation, liner 6 (prepared as in FIG. 1) is applied to the core 24 before said core is placed into parison mold 21. The core, together with the liner, is introduced into the parison mold together with neck mold 23 and the assembly clamped firmly together by a force transmitted through platen 27. Hot plastic is then pressed into the parison mold cavity from extruder 20 through runner plate 22, around the sleeve 6 which is on the core 24. A parison is thus molded forming a composite structure the inner layers of which are comprised of the material of the sleeve 6, namely, an innermost carrier layer containing the getter material 1 uniformly dispersed therein and a second barrier layer adhered to while its outer layer consists of the material pressed around that sleeve from the extruder 20.

If desired, the core 24 may be heated or conditioned by external heating prior to placing the cool liner thereon. The parison is then transferred into the blow mold 26 while still on the core 24 and within the neck mold 23. The core may be provided with an orifice 28 for pressure fluid, usually air. Orifice 28 may be closeable and is shown in the closed position in FIG. 2 and in the open position in FIG. 3. The core may consist of two components, the plug or poppet portion 29 and the collar or seat 30, whereby the plug is axially moveable to form a valve opening or orifice 28. In accordance with the present invention, the parison will be hot enough for blowing upon introduction into the blow mold. The parison is then expanded by means of fluid pressure through orifice 28 into conformance with the blow mold to form container 31. The container 31 is removed from the blow mold 26 upon cooling. The blow mold may be constructed in two halves 32 and 33 which may be separated, as shown, releasing the expanded finished article 31 which contains an inner layer representing the liner 6. The parison mold 21 and the neck mold 23 may also consist of more than one part each which may be separable to facilitate the removal of the parison or of the finished article, as shown.

Alternatively, one may dispense with the blowing operation and simply mold the container in desired configuration. In a still further embodiment, one may simply provide an inner, getter-containing carrier with a barrier plastic molded therearound.

The mechanical operation of the several elements shown in FIGS. 2 to 4 may be carried out by means described in my U.S. Pat. No. 3,029,468 and in numerous other patents, such as for example, U.S. Pat. No. 2,913,762, U.S. Pat. No. 2,298,716 and others. An apparatus particularly well suited for the purposes of the present invention is described in my U.S. Pat. No. Re. 27,104.

Frequently a plurality of blow cores are used as shown in FIG. 7 which provides a plurality of blow cores 41, 42, 43 and 44 mounted on a turntable 45 rotating on vertical shaft 46 by driving means 47 and 48. Thus, the blow cores rotate from one station to another, with core 41 being shown at the parison molding station in parison mold 49 covered by liner 50 with injection nozzle 51 in position to inject plastic therearound to form the composite parison. Core 42 is in the blow molding station in blow mold 52 with the composite parison being expanded into composite article 53. The blow mold is shown as being separable by means of pistons 54 and 55. Core 43 is shown in the article removal station with article 53 being shown separated therefrom. Core 44 is shown in the liner receiving station for receiving a liner 26 from liner storage means 56, which is moveable axially by means of piston 57 to apply a liner 50 on core 44.

According to FIGS. 8 and 9, two blow cores 60 and 61, or more if desired, are mounted on a common platen 62 which may be rotated or oscillated around shaft 63 by a suitable means such as by rack 64 acting on pinion 65 moving in the direction of the arrow, which shaft also serves to guide platen 62 in its movements parallel to the axis of the blow cores. As shown in FIG. 8, when blow core 60 is in alignment with blow mold 66, blow core 61 is in alignment with liner magazine 67. In operation, platen 62 is moved upward in the direction of the arrow and inserted into parison mold 68. The parison is then molded therearound by means of nozzle 69 and the assembly consisting of platen 62 and two cores 60 and 61 is lowered. A blow mold 66 is moved into juxtaposition with core 60 by means of piston 70, as shown in dot-dash lines, and the finished article blown therein. The blow mold with the finished article is then removed from the blow core. At the same time, the liner 71 is applied to the core by moving magazine 67 into engagement therewith by means of piston 72. The assembly consisting of platen 62 and blow cores 60 and 61 mounted thereon is rotated around rod 63 in the direction of the arrow so as to repeat the cycle. Since the time used to expand the parison on one core is also used to apply the liner on the other core, valuable production time is conserved.

As shown herein, the barrier plastic should be outermost with respect to the getter-containing carrier material. Thus, if oxygen permeation into the contents of a container is to be impeded, the barrier layer would provide primary protection against the oxygen permeation and oxygen permeating the barrier plastic would then be bound up by the getter.

As an alternative embodiment one may use a liner as shown in FIG. 5 wherein getter 80, coated with a permeable carrier 81 (or alternatively uncoated), is embedded in a carrier plastic 82 and a barrier layer injected therearound or laminated thereto. As a still further alternative, one may use a layered liner containing a plurality of layers as shown in FIG. 6 wherein two plastic barrier layers 83 and 84 are placed on either side of a carrier 85 containing a getter 86 uniformly dispersed throughout.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In the method of making multilayered hollow plastic containers having improved resistance to gas permeation wherein a parison is formed on a core in a parison mold by molding the plastic around said core in a parison mold cavity and wherein the parison is subsequently expanded in a blow mold, the improvement which comprises: providing a laminated sleeve of a first plastic carrier layer containing a getter material capable of binding unwanted gas and a second barrier plastic layer having substantial but incomplete resistance to gas permeation; applying said sleeve to said core; molding a plastic material around said sleeve and core; and expanding the sleeve and molded plastic together in a blow mold to form a hollow plastic container having improved resistance to gas permeation, wherein successive stations are used to apply said sleeve to said core, to mold a plastic around said sleeve, and to expand the sleeve and molded plastic together.

2. A method according to claim 1 wherein said molding is pressure molding.

3. A method according to claim 1 wherein said first plastic carrier layer is the inner layer and said second barrier plastic layer is the outer layer.

4. A method according to claim 1 wherein the barrier is selected from the group consisting of acrylonitrilecontaining polymers, terephthalic polyesters, and polyvinylidene dichloride, and wherein said carrier is selected from the group consisting of polyolefins and polystyrene.

5. A method according to claim 1 wherein said getter is an antioxidant.

6. A method according to claim 5 wherein said getter is propyl gallate.

7. A method according to claim 1 wherein said sleeve has an inner barrier layer, a central carrier layer containing said getter, and an outer barrier layer.

8. A method according to claim 1 wherein said core is moveable between successive stations.

9. A method according to claim 8 wherein the core is rotatably moveable.

10. A method according to claim 8 wherein the core is axially moveable.

11. A method according to claim 8 wherein the core is moveable between the further successive station to remove said container therefrom.

12. A method according to claim 11 including a plurality of cores.

* * * * *

UNITED STATES PATENT AND TRADEMARK OFFICE
CERTIFICATE OF CORRECTION

PATENT NO. : 4,092,391
DATED : May 30, 1978
INVENTOR(S) : Emery I. Valyi

It is certified that error appears in the above-identified patent and that said Letters Patent are hereby corrected as shown below:

In Column 1, line 8, after "Application" delete "No.".

In Column 4, line 31, after "butylated" delete ",".

In Column 8, line 29, claim 4, after "trile" insert -- - --.

Signed and Sealed this

Twenty-seventh Day of February 1979

[SEAL]

Attest:

RUTH C. MASON
Attesting Officer

DONALD W. BANNER
Commissioner of Patents and Trademarks